United States Patent Office 3,322,707
Patented May 30, 1967

3,322,707
COATING COMPOSITIONS
Raffaele W. Annonio and John P. Gilvary, Plainfield, N.J., assignors to Union Carbide Corporation, a corporation of New York
No Drawing. Filed June 11, 1964, Ser. No. 374,278
20 Claims. (Cl. 260—28.5)

This invention relates to improved vinyl polymer coating compositions. More particularly, it relates to vinyl chloride polymer coating compositions which exhibit low moisture vapor transmission and adhere well to cellophane.

By cellophane is meant the commercially available transparent cellulose sheeting made from viscose.

Vinyl chloride polymers have many desirable physical properties which recommend their use in compositions for coating cellophane as for example, water-resistance, non-toxicity, lack of odor, heat-sealability and colorless appearance. However, such compositions have been unsuccessfully applied in the past due to their poor adhesion and high moisture vapor transmission.

It is an object of this invention to provide vinyl chloride polymer compositions for coating cellophane derived from vinyl chloride polymers which retain the inherent physical properties of polyvinyl chloride while adding improved adhesion to cellophane and lower moisture vapor transmission.

Other objects of the invention will become apparent to those skilled in the art upon an examination of the detailed explanation below.

It has been discovered that a superior vinyl polymer coating composition for coating cellophane can be prepared from vinyl chloride polymers comprising in intimate admixture:

(a) Vinyl chloride polymer containing at least 60% vinyl chloride polymerized therein;
(b) From about 0.1 to 10% of an ethylene copolymer based on the weight of the vinyl chloride polymer;
(c) From about 2 to 25% of a polymethyl ether of hexamethylol melamine based on the weight of the vinyl chloride polymer;
(d) From about 0.1 to 3% of an organic acid based on the weight of the vinyl chloride polymer; and
(e) From 0 to about 6% of paraffin wax based on the weight of vinyl chloride polymer.

It is preferred that at least half of the total combined vinyl chloride in the vinyl chloride polymer be in a terpolymer containing a majority of combined vinyl chloride with a minor amount of a vinyl ester and a small amount of an alpha-beta unsaturated carboxylic acid polymerized therein and preferably maleic acid.

Particularly preferred terpolymers are those which contain at least 75% vinyl chloride, from 5 to 25% vinyl acetate and from 0.1 to 4% maleic acid combined therein. A commercially available terpolymer which is particularly useful is one containing about 86% vinyl chloride, about 14% vinyl acetate and about 1% maleic acid and having an inherent viscosity of about 0.54 according to ASTM D-1243-58T, Procedure A. Another such terpolymer is one comprised of about 82% vinyl chloride, 17% vinyl acetate and 1% maleic acid having an inherent viscosity of about 0.39, according to the same test. The invention is not limited to these compositions and variations may be used if desired. Thus, for example, maleic anhydride or an alkyl ester of maleic acid such as diethyl maleate, monoethyl maleate, dibutyl maleate and the like can also be combined in the preferred terpolymer. Other alpha-beta unsaturated carboxylic acids which can be used combined in the terpolymer include fumaric, acrylic, methacrylic and alpha chloroacrylic acids. The vinyl acetate moiety can be replaced by vinyl propionate or vinyl butyrate in these terpolymers if desired. It of course, is to be understood that other variations in the proportions of monomers used to make up the terpolymer can also be employed.

Where it is de rigueur to provide a lower cost composition, up to half of the vinyl chloride polymer can comprise a copolymer containing a majority of combined vinyl chloride with a minor amount of a vinyl ester, alpha-beta-unsaturated carboxylic acid or acid ester, or vinylidene halide. Preferred examples of such copolymers include vinyl chloride-vinyl acetate, vinyl chloride-vinyl propionate, vinyl chloride-vinyl butyrate, vinyl chloride-vinylidene chloride, vinyl chloride-vinylidene fluoride, vinyl chloride-butyl maleate, vinyl chloride-maleic acid, vinyl chloride-fumaric acid, vinyl chloride-acrylic acid, vinyl chloride-methacrylic acid, vinyl chloride-ethyl acrylate, vinyl chloride-butyl methacrylate, and like copolymers.

Particularly preferred vinyl chloride copolymers are those which contain at least 80% vinyl chloride and from 4 to 20% vinyl acetate. It is particularly preferred to use commercially available copolymers such as those containing about 85% vinyl chloride and 15% vinyl acetate or about 88% vinyl chloride and 12% vinyl acetate.

The ethylene copolymers which can be used in these improved vinyl polymer coating compositions are the ethylene-alkyl acrylate and the ethylene-vinyl ester copolymers. Although about 0.1 to 10% of these copolymers, based on the weight of vinyl chloride polymer can be employed, a preferred range is about 0.5 to 2%.

The term acrylate is meant in its generic sense to include those esters of lower acrylic acids such as acrylic, methacrylic, α-chloroacrylic and like acids having up to about 5 carbon atoms and preferably about 2 to 4 carbon atoms in the alkyl side chain. The ethylene-alkyl acrylate copolymers can contain from about 5 to 50% alkyl acrylate by weight polymerized therein with about 15 to 25% alkyl acrylate being preferred.

The ethylene-vinyl ester copolymers can include polymers comprising ethylene copolymerized therein with such monomers as vinyl formate, vinyl acetate, vinyl propionate, vinyl butyrate, vinyl 2,4-dimethylpentenoate, vinyl pelargonate, vinyl stearate, vinyl pivalate, vinyl tert-butyl acetate, vinyl diethylacetate, vinyl beta,gamma-dimethyl valerate, vinyl thioacetate, and the like. The preferred ethylene-vinyl ester copolymers of this invention, however, are the ethylene-vinyl acetate copolymers.

Among the ethylene-vinyl acetate copolymers that can be used are those containing from about 10 to 50% vinyl acetate polymerized therein with about 15 to 35% vinyl acetate being preferred. Particularly preferred copolymers are those containing about 72–82% ethylene and about 18–28% vinyl acetate with melt indices (ASTM D-1238–57T) of from 17 to 350 g./10 min., inherent viscosities at 30° C. of about 0.5 to 0.8 (0.25% by weight in toluene), tensile strengths of about 400 to 2000 p.s.i. (ASTM D-412), brittleness temperatures of about −38 to 100° C. (ASTM D-746–57T) and Durometer hardness of D 20 to 31 (ASTM D-1484–57T.)

The polymethyl ethers of polymethylol melamines are well know in the art as are methods for preparing them. Polymethylolmelamines can be prepared by reacting one mol of melamine with at least two mols of formaldehyde. The fully methylolated melamine, hexamethylol melamine, can be prepared by causing at least six moles of formaldehyde to react with one mole of melamine. In order to obtain the desired methyl ether, the polymethylol melamines are cause to react with the requisite amount of methanol.

Hexamethoxymethylmelamine, the completely etherified hexamethylol melamine, is the preferred melamine in this reaction and has been described in the chemical literature by A. Gams, G. Widmer and W. Fisch (Helv. Chim. Acta, 24, 302e (1941)).

The concentration of hexamethylol melamine is not narrowly critical and amounts as low as 2% and as high as 25% based on the weight of vinyl chloride polymer can be used. A preferred range is about 5% to 15% based on the weight of vinyl chloride polymer.

Any organic acid which is strong enough to effect crosslinking of the vinyl chloride polymer with the methlolated melamine can be used. Preferred organic acids include aryl sulfonic acids such as benzenesulfonic, benzene-m-disulfonic, benzene-p-disulfonic acids and the like. A particularly preferred organic acid is p-toluenesulfonic acid. The organic acid should be present in the vinyl polymer coating composition in a concentration high enough to catalyze the crosslinking of methylolated melamine. A perferred range is about 0.5% to 4% based on the weight of vinyl chloride polymer present although amounts as low as about 0.1% and as high as about 5% and higher can also be used if desired.

The term paraffin wax as used in this invention is meant to describe a solid, crystalline hydrocarbon mixture, wholly derived from that portion of crude petroleum commonly designated as paraffin distillate, by low temperature solidification or by solvent extraction. It is preferred to use fully refined paraffin wax having an American melting point range (A.M.P.) of about 118–155° F.

Any commercially available paraffin wax can be employed in the vinyl coating composition in a concentration up to about 6% based on the weight of vinyl chloride polymer. A preferred range is about 2% to 4%.

It is useful for the application of the coating compositions to the cellophane substrate to employ inert solvents, and plasticizers with the vinyl polymer coating composition. Suitable solvents include aromatic hydrocarbons, as for example, benzene, toluene, o-, m- or p-xylenes, ethylbenzene and the like; low molecular weight aliphatic esters having up to 10 carbon atoms, as for example, methyl acetate, ethyl acetate, n-propyl acetate, isopropyl acetate, n-butyl acetate, isobutyl acetate, sec-butyl acetate, tert-butyl acetate, methyl propionate, ethyl propionate and the like; ketones, as for example, acetone, methyl ethyl ketone, methyl isobutyl ketone, methyl isoamyl ketone, and the like; and nitroparaffins, such as nitromethane, nitroethane, 1-nitropropane and the like; and chlorinated hydrocarbons such as methylene chloride, ethylene dichloride, trichloroethylene and the like; and mixtures of the above enumerated solvents. The solvent concentration for use with the vinyl polymer coating compositions can range up to about 95% of the weight of the total composition but preferably lies between about 60% and 92%.

Suitable plasticizers which can be used in the vinyl coating compositions of this invention include phosphate esters, such as, tricresyl phosphate, cresyl diphenyl phosphate, octyldiphenyl phosphate and the like; phthalate esters such as benzyl cyclohexyl phthalate, butyl benzyl phthalate, cresyl benzyl phthalate, di-2-ethylhexyl phthalate, butyl phthalyl butyl glycolate, and the like; and epoxy plasticizers such as butyl epoxy stearate, epoxidized soy bean oil, epoxidized peanut oil and the like. Generally, up to 30 parts of plasticizers per hundred parts of vinyl chloride polymer can be added to the coating composition, although the preferred range is about 10 to 15 parts.

The vinyl chloride polymer coating compositions of this invention can be applied to or deposited on the cellophane sheet substrates by any of the myriad conventional coating operations as for example, dip coating, roller coating, knife coating, slush coating and other methods well known in the art. It is preferred to carry out the coating operation at temperatures of about 110° F. to 130° F. followed by a second baking step at about 190° F. to 250° F. for a time period of about 15 to 60 seconds to effect release of solvent from and crosslinking of the coating composition. The second step can be carried out continuously or batchwise by passage of the coated cellophane through a heated zone such as for example, an oven, or battery of drying lamps.

The moisture vapor transmission of the cellophane sheets coated on one side with the vinyl coating compositions of this invention was measured according to ASTM E–96–53T with values given in grams/24 hours/100 meters$^2$.

The adhesion test (similar to that described in the Plastics Engineers Handbook, page 639, Reinhold Publishing Co., 1959, N.Y.C.), was performed by pressing a strip of pressure sensitive tape, such as Scotch tape (trademark) in firm contact with the vinyl coated cellophane sheet and then pulling the tape rapidly away from the coated cellophane sheet. A rating of "excellent" denotes that none of the vinyl coated separated from the cellophane sheet while "poor" denotes that all of the coating in contact with the tape separated from the cellophane sheet.

Atmospheric pressure is preferred for the coating operation, although both superatmospheric and subatmospheric pressures can be employed, if desired.

If desired, minor amounts (that is, less than 5% by weight of the total coating composition), of other modifiers can be used with the vinyl chloride polymer coating composition such as, pigments as for example, barium sulfate, antimony oxide, calcium carbonate, zinc oxide, titanium dioxide, carbon black, yellow iron oxide, colloidal silica, cadmium reds, chrome oranges and yellows, phthalocyanine greens and blues and the like; heat stabilizers such as cadmium alkaryl phosphites, barium alkaryl phosphites, barium cadmium laurate, triaryl phosphates, barium ricinoleate, cadmium 2-ethylhexanoate, tin mercaptide, epoxy resins and the like; and light stabilizers such as sodium alkyl phosphates, dibenzyl phenol, N,N-diphenyl-p-phenylenediamine, 2-hydroxy-4-methoxy-, 2,2'-dihydroxy-4-methoxy-, 2-hydroxy-4-n-octoxy, 2,2'-dihydroxy-4-octoxy and 2,4-dihydroxybenzophenone, 2-hydroxy-4-methoxy-2'-carboxybenzophenone, 2-hydroxy-4-methoxy-5-sulfobenzophenone trihydrate, resorcinol monobenzoate, 4-dodecyl-2-hydroxy-, 5-chloro-2-hydroxy-, 2 - hydroxy-4-methoxy-, 2,2'-dihydroxy-4,4'-dimethoxy-, 2,2'-, 4,4'-tetrahydroxy-benzophenone, 2 - hydroxy-4-methoxy-benzophenone-5-sulfonic acid, sodium-2,2'-dihydroxy-4,4'-dimethoxy-4-sulfobenzophenone, 2,4-dibenzoylresorcinol, 2,4-dihydroxybenzophene, 2(2' - hydroxy - 5' - methylphenyl)-benzotriazole, alkylated hydroxyphenyl benzotriazoles, phenyl salicylate, 4-t-butylphenylsalicylate, p-octylphenyl salicylate, hexamethylphosphoric triamide, and such.

Strongly adhering vinyl chloride polymer coatings from about 0.05 to 1.0 mil in thickness and more can be applied readily to cellophane sheet substrates to provide a coated, transparent, heat sealable, moisture proof packaging film. These films are particularly useful for wrapping such items as fresh meat, bread, pretzels, nuts, candy, tobacco, frozen foods and the like. With commonly used cellophane sheeting of commerce, 0.5 to 1.0 mil thick, a vinyl polymer coating of about 0.1 to 0.5 mil thick is preferred although variations in the thickness of both the cellophane sheet, and vinyl polymer coating can be employed, if desired.

The heat sealed samples were prepared with a standard laboratory model, electrically heated heat sealer having a movable upper jaw of the hot bar type which afforded standard heat seals 1" in depth. The Sentinel Combination Laboratory Sealer manufactured by Packaging Industries of Montclair, N.J. is satisfactory for this purpose. The vinyl chloride polymer coated cellophane sheets were heat sealed, coating side to coating side using a pressure of 10 p.s.i. for three seconds at 120° C. The heat sealed cellophane sheets were then cut into strips ½" wide and heat seal strength measured as peel-strength on a tensile testing machine using a 500 g. load at a rate of ½" per minute.

The invention is further described by the examples which follow in which all parts and percentages are by weight.

Example 1

A vinyl chloride polymer coating composition was prepared from the following formulation:

| Component: | Parts by weight |
|---|---|
| Vinyl chloride/vinyl acetate/maleic acid terpolymer (85/14/1); inherent viscosity=0.5 | 4.9 |
| Vinyl chloride/vinyl acetate copolymer (85/15); inherent viscosity=0.5 | 4.9 |
| Di-2-ethylhexyl phthalate | 1.9 |
| Ethylene/vinyl acetate copolymer (72/28) (Melt Index=350) | 0.2 |
| Paraffin wax (A.M.P. 140° F.) | 0.4 |
| Hexamethoxymethylmelamine | 0.9 |
| p-Toluenesulfonic acid | 0.04 |
| Ethyl acetate | 59.0 |
| Toluene | 30.4 |

The ethylene-vinyl acetate copolymer and paraffin wax were dissolved in toluene at 130° F. The two vinyl chloride polymers were dissolved in ethyl acetate and toluene. These solutions were combined and the remaining components dissolved therein with agitation. This formulation was then heated to 120° applied as a coating to sheets of 0.6 mil cellophane, 12″ long and 6″ wide using a number 30 wire wound Meyer rod. The wet coated sheets were placed in an oven at 200° F. for 30 seconds which produced a dried crosslinked vinyl chloride polymer coating about 0.25 mil thick on the cellophane sheets.

The pressure sensitive tape adhesion test of these vinyl coated cellophane sheets was excellent, the heat seal strength 606 p.s.i. and the moisture vapor transmission 0.138 g./24 hours/100 meter². The moisture vapor transmission of uncoated cellophane sheets 0.6 to 0.8 mil thick was too high to record.

Example 2

Example 1 was repeated but omitting the hexamethoxymethylmelamine from the formulation. The Scotch tape adhesion of the vinyl coated cellophane was only fair, the heat seal strength dropped considerably to 176 p.s.i. and the moisture vapor transmission rose to 0.153 g./24 hours/100 meter².

Example 3

Example 1 was repeated but the ethylene-vinyl acetate copolymer was omitted from the formulation. The Scotch tape adhesion of the vinyl coated cellophane was only fair, the heat seal strength dropped to 254 p.s.i. and the moisture vapor transmission rose to 0.175 g./24 hours/100 meter².

Example 4

The effects obtained by varying the percentage of hexamethoxymethylmelamine in the vinyl chloride polymer composition are demonstrated by the four compositions shown below applied to cellophane sheet as in Example 1.

| Component | Parts by weight | | | |
|---|---|---|---|---|
| | A | B | C | D |
| Vinyl chloride/vinyl acetate/maleic acid terpolymer (85/14/1) inherent viscosity=0.5 | 4.9 | 4.9 | 4.9 | 4.9 |
| Vinyl chloride/vinyl acetate (85/15) inherent viscosity=0.5 | 4.9 | 4.9 | 4.9 | 4.9 |
| Ethylene/vinyl acetate copolymer (72/28); melt index=350 | 0.2 | 0.2 | 0.2 | 0.2 |
| Paraffin wax | 0.4 | 0.4 | 0.4 | 0.4 |
| Di-2-ethylhexyl phthalate | 1.9 | 1.9 | 1.9 | 1.9 |
| Ethyl acetate | 59.0 | 59.0 | 59.0 | 59.0 |
| Toluene | 30.4 | 30.4 | 30.4 | 30.4 |
| Hexamethoxymethylmelamine | 0.0 | 0.9 [1](10%) | 1.35 [1](15%) | 1.8 [1](20%) |
| p-Toluenesulfonic acid | 0.0 | 0.04 | 0.06 | 0.08 |

[1] Based on the weight of vinyl chloride polymer.

The test results shown below indicate that optimum adhesion, heat seal strength, moisture vapor transmission are obtained at a 10% level of hexamethoxymethylmelamine.

| Test | Composition | | | |
|---|---|---|---|---|
| | A | B | C | D |
| Scotch Tape Adhesion | Poor | Excellent | Excellent | Good |
| Heat Seal Strength | 176 | 606 | 440 | 280 |
| Moisture Vapor Transmission | 0.153 | 0.138 | 0.203 | 0.242 |

Example 5

The vinyl chloride polymer composition described in Example 1 was formulated substituting ethylene-ethyl acrylate copolymers containing 20 and 25% ethyl acrylate respectively, polymerized therein for the ethylene-vinyl acetate copolymer. The moisture vapor transmission results were comparable to those shown in Example 1 but this modification resulted in acceptable but lower heat seal strengths.

Although the invention has been described in its preferred forms with a certain degree of particularity, it is understood that the present disclosure has been made only by way of example, and that numerous changes may be resorted to without departing from the spirit and scope of the invention.

What is claimed is:

1. A vinyl polymer coating composition for coating cellophane consisting essentially of:
   (a) vinyl chloride polymer containing at least 60% vinyl chloride polymerized therein;
   (b) from about 0.1 to 10% of an ethylene copolymer based on the weight of the vinyl chloride polymer said ethylene copolymer being selected from the group consisting of ethylene-vinyl ester copolymers containing from about 10 to 50 percent by weight of vinyl ester polymerized therein, and ethylene-alkyl acrylate copolymers containing from about 5 to 50 percent by weigh of alkyl acrylate polymerized therein;
   (c) from about 2 to 25% of a polymethyl ether of hexamethylol melamine based on the weight of the vinyl chloride polymer;

(d) from about 0.1 to 3% of an organic acid based on the weight of the vinyl chloride polymer; and (e) from 0 to about 6% of paraffin wax based on the weight of the vinyl chloride polymer.

2. The composition claimed in claim 1 wherein the vinyl chloride polymer comprises a terpolymer of vinyl chloride, vinyl acetate and maleic acid and a copolymer of vinyl chloride and vinyl acetate.

3. The composition claimed in claim 2 wherein vinyl chloride, vinyl acetate and maleic acid are combined in the terpolymer in a weight ratio of about 85:14:1 respectively, and vinyl chloride and vinyl acetate and combined in the copolymer in a weight ratio of about 85:15 respectively.

4. The composition claimed in claim 2 wherein vinyl chloride, vinyl acetate and maleic acid are combined in the terpolymer in a weight ratio of about 82:17:1 respectively, and vinyl chloride and vinyl acetate are combined in the copolymer in a weight ratio of about 88:12 respectively.

5. The composition claimed in claim 1 wherein the ethylene copolymer is an ethylene-vinyl acetate copolymer.

6. The composition claimed in claim 5 wherein the weight ratio of ethylene to vinyl acetate in the ethylene-vinyl acetate copolymer is about 72:28 and its melt index is about 250.

7. The composition claimed in claim 5 wherein the weight ratio of ethylene to vinyl acetate in the ethylene vinyl acetate copolymer is about 72:28 and its melt index is about 17 to 23.

8. The composition claimed in claim 5 wherein the weight ratio of ethylene to vinyl acetate in the ethylene-vinyl acetate copolymer is about 82:18 and its melt index is about 145.

9. The composition claimed in claim 1 wherein the ethylene copolymer contains about 20 to 25% by weight of ethyl acrylate polymerized therein based on the weight of this copolymer.

10. The composition claimed in claim 1 wherein the polymethyl ether of hexamethylol melamine is hexamethoxymethylmelamine.

11. The composition claimed in claim 1 wherein the organic acid is p-toluenesulfonic acid.

12. The composition claimed in claim 1 containing about 2 to 4% of paraffin wax having an American melting point range of about 118–155° F.

13. Vinyl polymer coated cellophane article having low moisture vapor transmission comprising a cellophane substrate and deposited thereon a crosslinked vinyl polymer coating consisting essentially of:

(a) vinyl chloride polymer containing at least 60% vinyl chloride polymerized therein;

(b) from about 0.1 to 10% of an ethylene copolymer based on the weight of vinyl chloride polymers said ethylene copolymer being selected from the group consisting of ethylene-vinyl ester copolymers containing from about 10 to 50 percent by weight of vinyl ester polymerized therein, and ethylene-alkyl arcylate copolymers containing from about 5 to 50 percent by weight of alkyl acrylate polymerized therein;

(c) from about 2 to 25% of a polymethyl ether of hexamethylol melamine based on the weight of vinyl chloride polymers;

(d) from about 0.1 to 3% of an organic acid based on the weight of vinyl chloride polymers; and (e) from 0 to about 6% of paraffin wax based on the weight of vinyl chloride polymers.

14. The article claimed in claim 13 wherein the vinyl chloride polymer comprises a terpolymer of vinyl chloride, vinyl acetate and maleic acid combined therein in a weight ratio of about 85:14:1 respectively, and a copolymer of vinyl chloride and vinyl acetate combined therein in a weight ratio of about 85:15 respectively.

15. The article claimed in claim 13 wherein the vinyl chloride polymer comprises a terpolymer of vinyl chloride, vinyl acetate and maleic acid combined therein in a weight ratio of about 82:17:1 respectively, and a copolymer of vinyl chloride and vinyl acetate combined therein in a weight ratio of about 85:15 respectively.

16. The article claimed in claim 13 wherein the ethylene copolymer is an ethylene-vinyl acetate copolymer having a weight ratio of about 72:28 and a melt index of about 350.

17. The article claimed in claim 13 wherein the ethylene copolymer is an ethylene-ethyl acrylate copolymer containing by 20 to 25% by weight of ethyl acrylate.

18. The article claimed in claim 13 wherein the vinyl polymer coating composition contains about 5 to 12% of hexamethoxymethylmelamine and about 0.1 to 3% of p-toluenesulfonic acid both based on the weight of vinyl chloride polymer.

19. The article claimed in claim 13 wherein the vinyl polymer coating composition contains about 2 to 4% of paranffin wax having an American melting point range of about 118–155° F.

20. The article claimed in claim 13 wherein the vinyl polymer coating composition is crosslinked by heating up to a temperature of about 230° F.

References Cited

UNITED STATES PATENTS

| | | | |
|---|---|---|---|
| 2,946,702 | 7/1960 | Bach | 260—899 |
| 2,998,410 | 8/1961 | Jefts et al. | 260—67.6 |
| 3,062,778 | 11/1962 | Van Cleve et al. | 260—897 |
| 3,125,545 | 3/1964 | Van Cleve et al. | 260—897 |
| 3,211,676 | 10/1965 | Spencer | 260—853 |
| 3,211,806 | 10/1965 | Petropoulos et al. | 260—853 |

FOREIGN PATENTS 844,509  8/1960  Great Britain.

MORRIS LIEBMAN, *Primary Examiner.*

B. A. AMERNICK, *Assistant Examiner.*